United States Patent
Shimizu et al.

(10) Patent No.: US 7,473,205 B2
(45) Date of Patent: Jan. 6, 2009

(54) HYBRID VEHICLE AND CONTROL METHOD OF HYBRID VEHICLE

(75) Inventors: Yasuo Shimizu, Toki (JP); Eiji Ichioka, Toyota (JP); Hideto Watanabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 318 days.

(21) Appl. No.: 11/508,880

(22) Filed: Aug. 24, 2006

(65) Prior Publication Data

US 2007/0049456 A1 Mar. 1, 2007

(30) Foreign Application Priority Data

Aug. 25, 2005 (JP) ............................. 2005-243951

(51) Int. Cl.
*B60K 1/02* (2006.01)
(52) U.S. Cl. ..................... 477/3; 477/98; 180/65.2; 290/40 C; 290/41
(58) Field of Classification Search .............. 477/2, 477/3, 4, 5, 6, 98, 902; 180/65.2; 290/37 R, 290/38 R, 40 R, 41, 40 C, 51; 903/930
See application file for complete search history.

(56) References Cited

U.S. PATENT DOCUMENTS

| 5,934,395 | A | 8/1999 | Koide et al. | |
|---|---|---|---|---|
| 6,396,165 | B1 * | 5/2002 | Nagano et al. | 307/10.6 |
| 6,752,225 | B2 * | 6/2004 | Kojima | 180/65.3 |

FOREIGN PATENT DOCUMENTS

| JP | A 2002-147320 | 5/2002 |
|---|---|---|
| JP | A 2004-254434 | 9/2004 |
| JP | A 2005-30281 | 2/2005 |
| JP | A-2005-143270 | 6/2005 |

* cited by examiner

*Primary Examiner*—David D. Le
(74) *Attorney, Agent, or Firm*—Oliff & Berridge, PLC

(57) ABSTRACT

In the case where a start command of an engine is given with a gearshift lever being operated to a parking position, when a cooling water temperature Tw is lower than a threshold value Twref, and a stop time tst of the engine is a threshold value tstref or longer (S110 and S120), a relatively large predetermined torque T2 is set to a power-holding torque Tg (S140), and the power-holding torque Tg added to a torque for canceling a reaction torque is output from a second motor to motor and start the engine. This allows the engine to be started with a backlash between gears being eliminated even when resistance in motoring the engine is relatively large.

14 Claims, 4 Drawing Sheets

HYBRID VEHICLE AND CONTROL METHOD OF HYBRID VEHICLE

BACKGROUND OF THE INVENTION

1. Field of the Invention

The present invention relates to a hybrid vehicle and a control method of the hybrid vehicle.

2. Description of the Prior Art

One proposed hybrid vehicle has an engine and a first motor connected via a planetary gear mechanism to a drive shaft coupled to an axle via a gear mechanism, and a second motor connected to the drive shaft, and starts the engine while canceling a torque as a reaction force acting on the drive shaft with the start of the engine using the second motor (see, for example, Japanese Patent Laid-Open Gazette No. 2005-30281). In this proposed hybrid vehicle, the torque is output from the second motor in view of a cooling water temperature of the engine to inhibit torque shock in initial explosion at the start of the engine.

SUMMARY OF THE INVENTION

Generally, in such a hybrid vehicle, a torque pulse based on friction of a piston of the engine or the viscosity of oil for lubricating the engine may act on a drive shaft to cause a backlash between gears in motoring the engine. In order to inhibit the backlash between the gears, starting the engine with the backlash between the gears being eliminated by a motor MG2 is considered. The size of the torque pulse differs according to the state of the engine in motoring, and thus the state of the engine is desirably considered in eliminating the backlash.

A hybrid vehicle and a control method of the hybrid vehicle according to the present invention have an object to inhibit a backlash between gears at the start of an internal combustion engine.

At least part of the above and the other related objects is attained by a hybrid vehicle and a control method of the hybrid vehicle of the invention having the configurations discussed below.

The present invention is directed to a hybrid vehicle. The hybrid vehicle includes: an internal combustion engine that can output power to a drive shaft coupled to an axle via a gear mechanism; a motoring unit that is connected to an output shaft of the internal combustion engine and the drive shaft, and motors the internal combustion engine with input and output of power to and from the drive shaft; a motor that can input and output of power to and from the drive shaft; an estimation module that estimates that motoring resistance, which is resistance of the internal combustion engine in monitoring the internal combustion engine, becomes predetermined resistance or higher; and a starting control module that controls, when a start command of the internal combustion engine is given, the internal combustion engine, the motoring unit, and the motor so that the internal combustion engine is started while meshing gears in the gear mechanism is pressed toward one side by a first torque when it is estimated by the estimation module that the motoring resistance becomes lower than the predetermined resistance, and so that the internal combustion engine is started while the meshing gears in the gear mechanism is pressed toward one side by a second torque larger than the first torque when it is estimated by the estimation module that the motoring resistance becomes the predetermined resistance or higher.

In the hybrid vehicle according to the present invention, when the start command of the internal combustion engine is given, the internal combustion engine, the motoring unit, and the motor are controlled so that the internal combustion engine is started while the meshing gears in the gear mechanism is pressed toward one side by the first torque when it is estimated that the motoring resistance that is the resistance of the internal combustion engine in monitoring the internal combustion engine becomes lower than the predetermined resistance, and the internal combustion engine, the motoring unit, and the motor are controlled so that the internal combustion engine is started while the meshing gears in the gear mechanism is pressed toward one side by the second torque larger than the first torque when it is estimated that the motoring resistance becomes the predetermined resistance or higher. This allows the internal combustion engine to be started with a backlash between the gears being eliminated even when the motoring resistance is relatively large. This can inhibit the backlash in the gear mechanism at the start of the internal combustion engine.

The hybrid vehicle according to the present invention may include temperature measurement unit that measures the temperature of the internal combustion engine, and the estimation module may estimate that the motoring resistance becomes the predetermined resistance or higher when the measured temperature is lower than a predetermined temperature. This allows more proper estimation of the motoring resistance becoming the predetermined resistance or higher based on the temperature of the internal combustion engine.

In one preferable embodiment of the hybrid vehicle including temperature measurement unit of the invention, the hybrid vehicle further includes a stop time measurement unit that measures a stop time of the internal combustion engine. The estimation module estimates that the motoring resistance becomes the predetermined resistance or higher when the measured temperature is lower than a predetermined temperature and the measured stop time is a predetermined time or longer. In this case, the stop time measurement unit measures time since the last turning off of ignition as the stop time of said internal combustion engine. Also, the stop time measurement unit measures time since the last stop of said internal combustion engine as the stop time of said internal combustion engine. This allows more proper estimation of the motoring resistance becoming the predetermined resistance or higher based on the temperature and the stop time of the internal combustion engine.

In another preferable embodiment of the hybrid vehicle including temperature measurement unit of the invention, the hybrid vehicle further includes a start number measurement unit that measures the number of starts as the number of starts of the internal combustion engine after the ignition is turned on. The estimation module estimates that the resistance of the internal combustion engine at the start of the internal combustion engine becomes the predetermined resistance or higher when the measured temperature is lower than a predetermined temperature and the measured number of starts is smaller than the predetermined number. This allows more proper estimation of the motoring resistance becoming the predetermined resistance or higher based on the temperature and the number of starts of the internal combustion engine.

The hybrid vehicle according to the present invention may include a securing unit that can secure the axle so as not to be rotated, and the starting control module may control the internal combustion engine, the motoring unit and the motor to start the internal combustion engine while the meshing gears in the gear mechanism is pressed toward one side by the first torque or the second torque when the start command of the internal combustion engine is given with the axle being secured by the securing unit. This can inhibit a backlash between the gears at the start of the internal combustion engine with the axle being secured by the securing unit. The state where the axle is secured by the securing unit includes the state where the axle is secured by meshing between the gears with an operation of a gearshift lever to a parking position or the state where the axle is secured with a brake operation.

In one preferable embodiment of the hybrid vehicle of the invention, the motoring unit is connected to the output shaft of the internal combustion engine and the drive shaft, and can output at least part of power from the internal combustion engine to the drive shaft with input and output of electric power and mechanical power.

The present invention is also directed to a control method of a hybrid vehicle. The hybrid vehicle includes: an internal combustion engine that can output power to a drive shaft coupled to an axle via a gear mechanism; a motoring unit that is connected to an output shaft of the internal combustion engine and the drive shaft, and motors the internal combustion engine with input and output of power to and from the drive shaft; and a motor that can input and output of power to and from the drive shaft, the control method comprising the step of controlling, when a start command of said internal combustion engine is given, said internal combustion engine, said motoring unit, and said motor so that said internal combustion engine is started while meshing gears in said gear mechanism is pressed toward one side by a first torque when it is estimated that said motoring resistance as a resistance of said internal combustion engine in motoring said internal combustion engine becomes lower than the predetermined resistance, and so that said internal combustion engine is started while the meshing gears in said gear mechanism is pressed toward one side by a second torque larger than said first torque when it is estimated that the motoring resistance becomes said predetermined resistance or higher.

In the control method of the hybrid vehicle according to the present invention, when the start command of the internal combustion engine is given, the internal combustion engine, the motoring unit, and the motor are controlled so that the internal combustion engine is started while the meshing gears in the gear mechanism is pressed toward one side by the first torque when it is estimated that the motoring resistance that is the resistance of the internal combustion engine in monitoring the internal combustion engine becomes lower than the predetermined resistance, and the internal combustion engine, the motoring unit, and the motor are controlled so that the internal combustion engine is started while the meshing gears in the gear mechanism is pressed toward one side by the second torque larger than the first torque when it is estimated that the motoring resistance becomes the predetermined resistance or higher. This allows the internal combustion engine to be started with a backlash between the gears being eliminated even when the motoring resistance is relatively large. This can inhibit the backlash in the gear mechanism at the start of the internal combustion engine.

In one preferable embodiment of the control method of the hybrid vehicle of the invention, the control method further includes the step of performing the control while estimating that the motoring resistance becomes the predetermined resistance or higher when the temperature of the internal combustion engine is lower than a predetermined temperature. This allows more proper estimation of the motoring resistance becoming the predetermined resistance or higher based on the temperature of the internal combustion engine.

In another preferable embodiment of the control method of the hybrid vehicle of the invention, the control method includes the step of performing the control while estimating that said motoring resistance becomes said predetermined resistance or higher when the temperature of the internal combustion engine is lower than the predetermined temperature, and a stop time of the internal combustion engine is a predetermined time or longer. In this case, the stop time of the internal combustion engine is a time since the last turning off of ignition. Further, the stop time of the internal combustion engine is a time since the last stop of said internal combustion engine. This allows more proper estimation of the motoring resistance becoming the predetermined resistance or higher based on the temperature and the stop time of the internal combustion engine.

In another preferable embodiment of the control method of the hybrid vehicle of the invention, the control method further includes the step of performing the control while estimating that the resistance of the internal combustion engine at the start of the internal combustion engine becomes the predetermined resistance or higher when the temperature of the internal combustion engine is lower than the predetermined temperature and the number of starts as the number of starts of said internal combustion engine after the ignition is turned on is smaller than the predetermined number.

DESCRIPTION OF THE PREFERRED EMBODIMENTS

Figure 1:
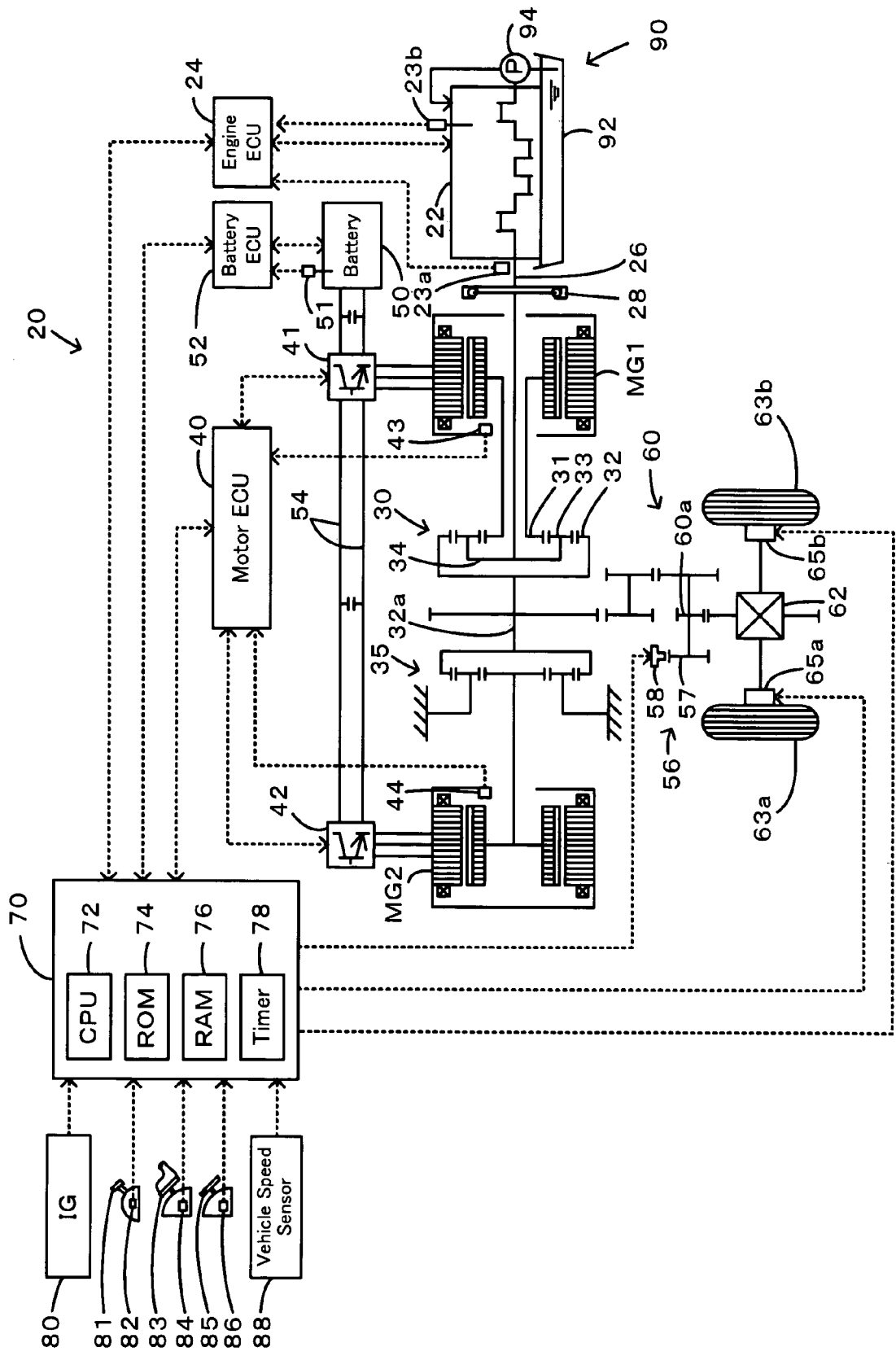
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that outputs power from a hydrocarbon-based fuel such as gasoline or gas oil, and subjected to operation control such as fuel injection control, ignition control, or intake air flow adjustment control by an engine electronic control unit (hereinafter referred to as an engine ECU) 24. A crank position from a crank position sensor 23a that measures a crank position of a crankshaft 26 of the engine 22, or a cooling water temperature Tw from a water temperature sensor 23b that measures a temperature of cooling water of the engine 22 are input in the engine ECU 24. The engine ECU 24 communicates with a hybrid electronic control unit 70, controls the operation of the engine 22 according to control signals from the hybrid electronic control unit 70, and outputs data on an operation state of the engine 22 to the hybrid electronic control unit 70 as required.

The engine 22 is lubricated by a lubrication system 90. The lubrication system 90 lubricates the engine 22 by wet sump in which oil stored in an oil pan 92 is supplied to machine parts of the engine 22 using an oil pump 94. In such a wet sump lubrication system 90, most of the oil supplied to the engine 22 generally drops by gravity and is stored in the oil pan 92, and thus part of the crankshaft 26 is immersed in the oil, when the engine 22 is stopped for long hours.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33, in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

A parking lock mechanism 56 constituted by a parking gear 57 mounted to a final gear 60a, and a parking lock pole 58 that meshes with and locks the parking gear 57 to stop rotation thereof are mounted to the gear mechanism 60. The parking lock pole 58 is operated by an unshown actuator driven and controlled by the hybrid electronic control unit 70 into which an operation signal from other position to a parking position (a P range) of a gearshift lever 81 or an operation signal from the parking position to other position is input, and comes into or out of mesh with the parking gear 57 to lock and unlock parking. The final gear 60a is mechanically connected to the drive wheels 63a and 63b, and thus the parking lock mechanism 56 indirectly locks the drive wheels 63a and 63b.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, a timer 78 that counts time based on commands, and an unshown input-output port, and an unshown communication port. The hybrid electronic control unit 70 receives various inputs via the input port: an ignition signal from an ignition switch 80, a gearshift position SP from a gearshift position sensor 82 that measures the current position of the gearshift lever 81, an accelerator opening Acc from an accelerator pedal position sensor 84 that measures a depression amount of an accelerator pedal 83, a brake pedal position BP from a brake pedal position sensor 86 that measures a depression amount of a brake pedal 85, and a vehicle speed V from a vehicle speed sensor 88. The hybrid electronic control unit 70 outputs a drive signal to an unshown actuator of brakes 65a and 65b that apply a braking force to the drive wheels 63a and 63b with a driver's is operation of a brake pedal 85, or the like via an output port. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. The hybrid electronic control unit 70 is operated by electric power supplied from an unshown auxiliary battery, and time can be counted by the timer 78 regardless of the on/off state of the ignition switch 80.

Figure 2:
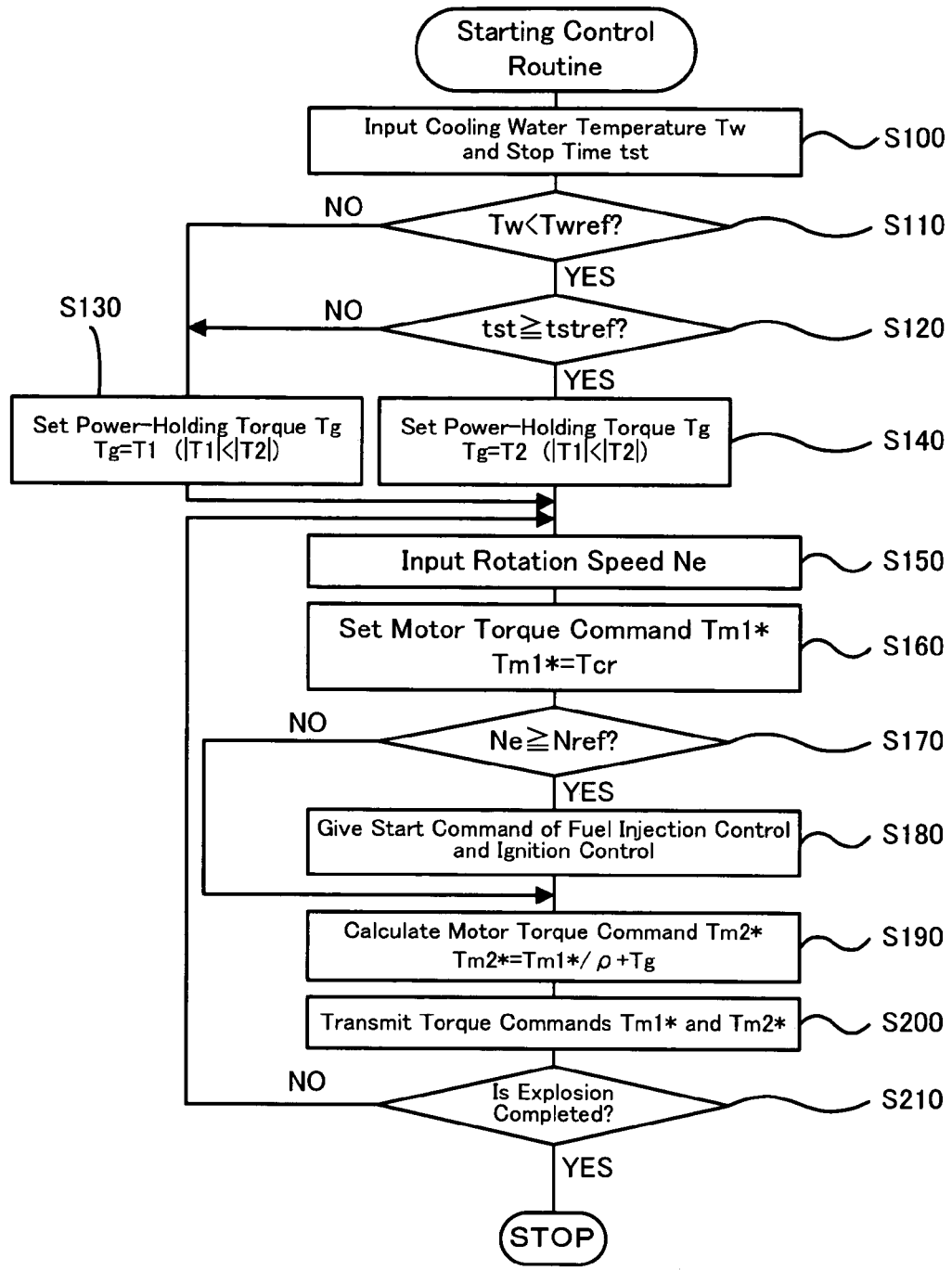
FIG. 2 is a flowchart showing a drive control routine executed by a hybrid electronic control unit included in the hybrid vehicle of the embodiment.

The description now regards the operations of the hybrid vehicle 20 having the configuration discussed above, and more particularly the operations at the start of the engine 22 with the gearshift lever 81 being operated to the parking position (the P range). FIG. 2 is a flowchart showing an example of a starting control routine executed by the hybrid electronic control unit 70 according to the embodiment. This routine is executed when the start command of the engine 22 is given with the gearshift lever 81 being operated to the parking position.

When the starting control routine is executed, the CPU 72 of the hybrid electronic control unit 70 first executes a processing of inputting data required for control such as the cooling water temperature Tw or a stop time t of the engine 22 (Step S100). The cooling water temperature Tw measured by the water temperature sensor 23b is input from the engine ECU 24 by communication. A stop time tst of the engine 22 is input by starting counting time with the timer 78 at the stop of the engine 22, storing the value of the timer 78 when the start command of the engine 22 is given in a predetermined area of the RAM 76, and reading the value.

Data is thus input, then the input cooling water temperature Tw of the engine 22 is compared with a threshold value Twref (Step S110), and a stop time tst of the engine 22 is compared with a threshold value tstref when the cooling water temperature Tw is lower than the threshold value Twref (Step S120). The threshold value Twref and the threshold value tstref are threshold values used for determining whether a relatively large torque pulse acts on a ring gear shaft 32a as a drive shaft in motoring the engine 22, the threshold value Twref can be determined according to the kind of the oil or the like used for lubricating the engine 22, and the threshold value tstref can be determined by the kind of the oil or the characteristic of the engine 22. Now, the start of the engine 22 will be considered. When the engine 22 is motored by the motor MG1 to start the engine 22, a torque pulse based on resistance (hereinafter referred to as motoring resistance) such as friction of a piston or the viscosity of the oil acts on the ring gear shaft 32a as the drive shaft. The viscosity of the oil tends to be relatively small when the cooling water temperature Tw is high, and relatively large when the cooling water temperature Tw is low. When the engine 22 is stopped for long hours, part of the crankshaft 26 is immersed in the oil stored in the oil pan 92 as described above. Thus, when the engine 22 is started in the state where the cooling water temperature Tw is low and the engine 22 is stopped for long hours, specifically, the state where part of the crankshaft 26 is immersed in the oil with high viscosity, the motoring resistance is increased and a relatively large torque pulse acts on the ring gear shaft 32a. The comparison between the cooling water temperature Tw and the threshold value Twref and the comparison between the stop time tst and the threshold value tstref in Steps S110 and S120 determine whether the motoring resistance is large.

When the cooling water temperature Tw is the threshold value Twref or higher, or the cooling water temperature Tw is lower than the threshold value Twref and the stop time tst is lower than the threshold value tstref, it is determined that the motoring resistance is not very large, and a predetermined torque T1 is set to a power-holding torque Tg (Step S130). On the other hand, when the cooling water temperature Tw is lower than the threshold value Twref and the stop time tst is the threshold value tstref or higher, it is determined that the motoring resistance is relatively large, and a predetermined torque T2 larger than the predetermined torque T1 is set to the power-holding torque Tg (Step S140). The predetermined torques T1 and T2 are set to be slightly larger than torques output by the torque pulse to the ring gear shaft 32a as the drive shaft in motoring the engine 22 when the motoring resistance is small and large, respectively, and set as torques in the same direction as a torque for canceling a reaction torque output to the drive shaft with motoring of the engine 22 with the motor MG1. The power-holding torque Tg is thus set to set a power-holding torque Tg according to the motoring resistance (the predetermined torque T1 when the motoring resistance is small, and the predetermined torque T2 when the motoring resistance is large).

Figure 3:
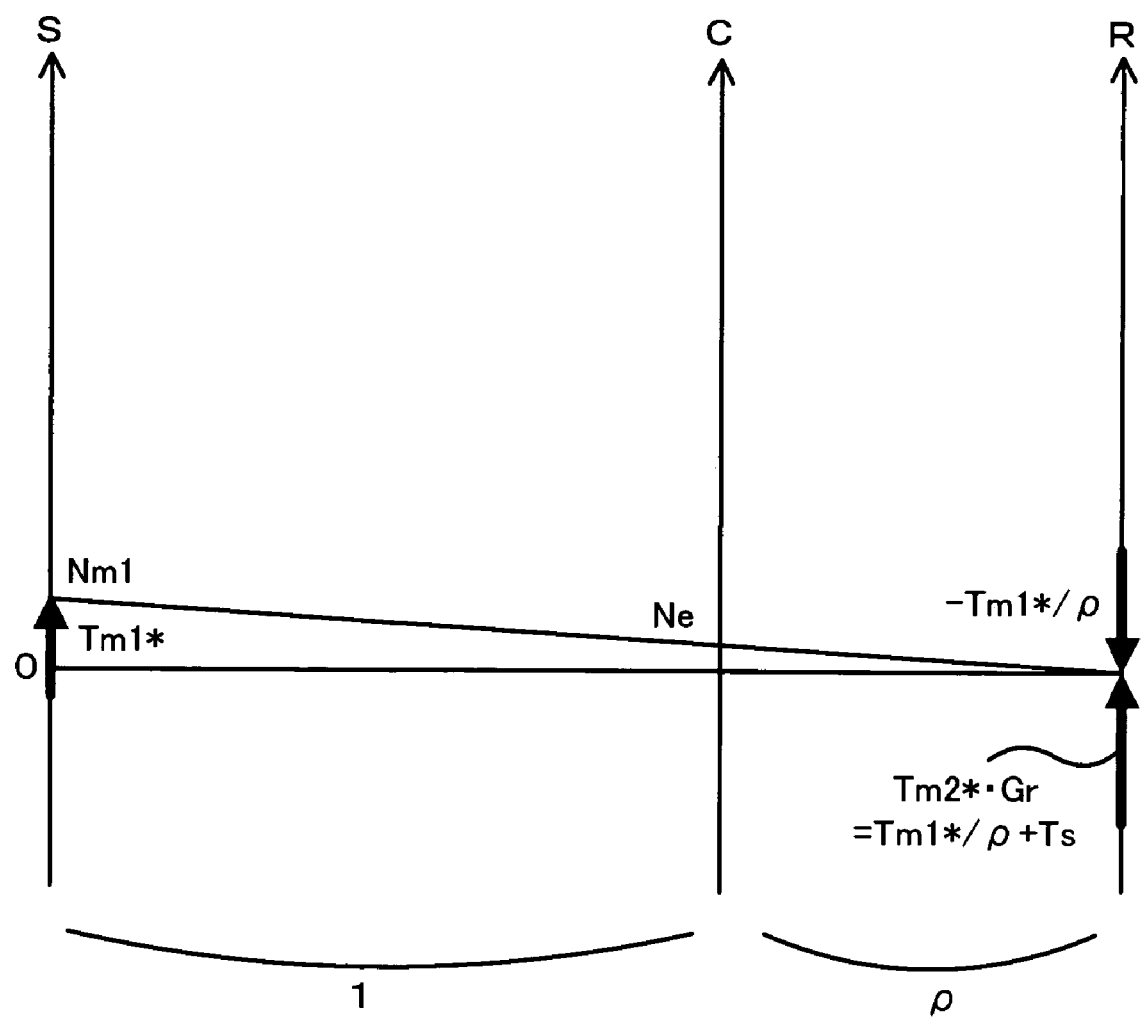
FIG. 3 is an alignment chart showing a dynamic relationship between the rotation speed of each rotation element of the power distribution and integration mechanism 30 and the torque at the start of the engine 22.

Next, the rotation speed Ne of the engine 22 calculated based on the crank position measured by the crank position sensor 23a is input from the engine ECU 24 by communication (Step S150), a torque Tcr for motoring the engine 22 is set in a torque command Tm1* of the motor MG1 (Step S160), and the input rotation speed Ne is compared with the threshold value Nref (Step S170). The threshold value Nref is the rotation speed Ne of the engine 22 for starting the fuel injection control or the ignition control, and for example, set to 800 rpm or 1000 rpm. When the rotation speed Ne is lower than the threshold value Nref, it is determined that the rotation speed for starting the fuel injection control or the ignition control has not yet reached, and a torque command Tm2* of the motor MG2 is set according to Equation (1) given below based on a torque for canceling a reaction torque output to the ring gear shaft 32a as the drive shaft with the motoring of the engine 22, and the power-holding torque Tg set in Steps S130 and S140 (Step S190). Equation (1) is a dynamic relational expression of the rotation elements of the power distribution and integration mechanism 30. FIG. 3 shows an alignment chart showing a dynamic relationship between the rotation speed of each rotation element of the power distribution and integration mechanism 30 and the torque at the start of the engine 22. In FIG. 3, an S-axis on the left shows the rotation speed of the sun gear 31 that is the rotation speed Nm1 of the motor MG1, a C-axis shows the rotation speed of the carrier 34 that is the rotation speed Ne of the engine 22, and an R-axis shows the rotation speed Nr of the ring gear 32 obtained by dividing the rotation speed Nm2 of the motor MG2 by a gear ratio Gr of the reduction gear 35. Equation (1) can be easily derived from the alignment chart in FIG. 3. The torque command Tm2* of the motor MG2 is thus set to allow the engine 22 to be motored and started with a backlash in the gear mechanism 60 or the parking lock mechanism 56 being eliminated even when the cooling water temperature Tw is low and the stop time tst is long, specifically when the motoring resistance is large. This inhibits a backlash between the gears in the gear mechanism 60a or a backlash between the parking gear 57 and the parking lock pole 58 in the parking lock mechanism 56 at the start of the engine 22. When the cooling water temperature Tw is high, or when the cooling water temperature Tw is low and the stop time tst is short, specifically when the motoring resistance is small, the backlash between the gears can be inhibited, and power consumption of the motor MG2 can be inhibited.

$$Tm2^* = Tm1^*/\rho + Tg \tag{1}$$

When the torque commands Tm1* and Tm2* of the motors MG1 and MG2 are set, the set torque commands Tm1* and Tm2* of the motors MG1 and MG2 are transmitted to the motor ECU 40 (Step S200). The motor ECU 40 having received the torque commands Tm1* and Tm2* controls switching of switching elements of the inverters 41 and 42 so that the motor MG1 is driven by the torque command Tm1* and the motor MG2 is driven by the torque command Tm2*. Then, it is determined whether the explosion of the engine 22 is completed (Step S210). Considering that the fuel injection control is not started, the explosion of the engine 22 is not completed, and the process returns to Step S150.

On the other hand, when the rotation speed Ne of the engine 22 is the threshold value Nref or higher in Step S170, the start command of the fuel injection control or the ignition control is given to the engine ECU 24 (Step S180), and the processings of Step S190 and thereafter are executed. The engine ECU24 having received the command starts an operation control of the engine 22 such as the fuel injection control or the ignition control. Then, when it is determined in Step S210 that the explosion of the engine 22 is completed, the starting control routine is finished.

According to the hybrid vehicle 20 of the embodiment as described above, when the start command of the engine 22 is given with the gearshift lever 81 being operated to the parking position, the motor MG2 is driven and controlled so that the sum of the power-holding torque Tg of the predetermined torque T1 and the torque for canceling the reaction torque acting on the ring gear shaft 32a as the drive shaft with motoring of the engine 22 is output from the motor MG2 when the cooling water temperature Tw is the threshold value Twref or higher, or when the cooling water temperature Tw is lower than the threshold value Twref and the stop time tst is shorter than the threshold value tstref, and the motor MG2 is driven and controlled so that the sum of the power-holding torque Tg of the predetermined torque T2 larger than the predetermined torque T1 and the torque for canceling the reaction torque is output from the motor MG2 when the cooling water temperature Tw is lower than the threshold value Twref and the stop time tst is the threshold value tstref or higher. This allows the engine 22 to be motored and started with the backlash in the gear mechanism 60 or the parking lock mechanism 56 being eliminated even when the motoring resistance is large. This inhibits the backlash in the gear mechanism 60 and the parking lock mechanism 56 at the start of the engine 22.

In the hybrid vehicle 20 of the embodiment, the operations have been described of starting the engine 22 with the gearshift lever 81 being operated to the parking position, but the engine 22 may be started similarly to the embodiment even when, for example, the gearshift lever 81 is operated to a drive position or the like and the brake pedal 85 is depressed, as long as the drive wheels 63a and 63b are locked. In this case, the backlash between the gears in the gear mechanism 60 may be inhibited at the start of the engine 22. When the gearshift position SP is operated to the drive position or the like and the vehicle is running, the engine 22 may be started further in view of a torque demand Tr* required for the vehicle.

In the hybrid vehicle 20 of the embodiment, the power-holding torque Tg is set as the torque in the same direction as the torque for canceling the reaction torque output to the drive shaft with motoring of the engine 22 by the motor MG1, but may be set in a different direction.

In the hybrid vehicle 20 of the embodiment, the power-holding torque Tg is set based on the cooling water temperature Tw and the stop time tst of the engine 22, but the power-holding torque Tg may be set based on the cooling water temperature Tw only regardless of the stop time tst, specifically, regardless of whether part of the crankshaft 26 of the engine 22 is immersed in the oil stored in the oil pan 92. In this case, the predetermined torque T1 may be set to the power-holding torque Tg when the cooling water temperature Tw is the threshold value Twref or higher, and the predetermined torque T2 may be set to the power-holding torque Tg when the cooling water temperature Tw is lower than the threshold value Twref.

In the hybrid vehicle 20 of the embodiment, the cooling water temperature Tw is used as the temperature of the engine 22, but instead of the cooling water temperature Tw, for example, the temperature of oil Toil or the viscosity of the oil ηoil may be used. In use of the viscosity of the oil ηoil, the predetermined torque T1 maybe set to the power-holding torque Tg when the viscosity of the oil soil is a threshold value ηoilref or lower, or the viscosity of the oil ηoil is higher than the threshold value ηoilref and the stop time tst of the engine 22 is shorter than the threshold value tstref, and the predetermined torque T2 maybe set to the power-holding torque Tg when the viscosity of the oil ηoil is higher than the threshold value Toilref and the stop time tst is the threshold value tstref or longer.

In the hybrid vehicle 20 of the embodiment, the stop time tst of the engine 22 is the time between when the engine 22 is stopped and when the start command of the engine 22 is given, but may be time between when the ignition switch 80 is turned off and when the start command of the engine 22 is given after the ignition switch 80 is next turned on, time between when the engine 22 is stopped and the start of the engine is completed based on the time between when the engine 22 is stopped and when the start command of the engine 22 is given and the time required for starting the engine 22, or time between when the ignition switch 80 is turned off and when the start of the engine 22 is completed based on the time between when the ignition switch 80 is turned off and when the start command of the engine 22 is given after the ignition switch 80 is next turned on, and the time required for starting the engine 22. Instead of the stop time tst, the power-holding torque Tg may be set based on the number of starts Nst as the number of starts of the engine 22 after the ignition switch 80 is turned on. In this case, the predetermined torque Ti may be set to the power-holding torque Tg when the cooling water temperature Tw is the threshold value Twref or higher, or the cooling water temperature Tw is lower than the threshold value Twref and the number of starts Nst is a threshold value Nstref or larger, and the predetermined torque T2 may be set to the power-holding torque Tg when the cooling water temperature Tw is lower than the threshold value Twref and the number of starts Nst is smaller than the threshold value Nstref.

In the hybrid vehicle 20 of the embodiment, the predetermined torque T2 larger than the predetermined torque T1 is set to the power-holding torque Tg when the cooling water temperature Tw is lower than the threshold value Twref and the stop time tst is the threshold value tstref or longer, but a torque set to be increased with decreasing cooling water temperature Tw, or a torque set to be increased with increasing stop time tst, or the like may be set to the power-holding torque Tg as long as the torque is larger than the predetermined torque T1.

In the hybrid vehicle 20 of the embodiment, the predetermined torque T1 is set to the power-holding torque Tg both when the cooling water temperature Tw is the threshold value Twref or higher and when the cooling water temperature Tw is lower than the threshold value Twref and the stop time tst is shorter than the threshold value tstref, but different torques may be set to the power-holding torque T1. For example, the predetermined torque T1 may be set to the power-holding torque Tg when the cooling water temperature Tw is lower than the threshold value Twref and the stop time tst is shorter than the threshold value tstref, and a predetermined torque T3 smaller than the predetermined torque T1 may be set to the power-holding torque Tg when the cooling water temperature Tw is the threshold value Twref or higher.

Figure 4:
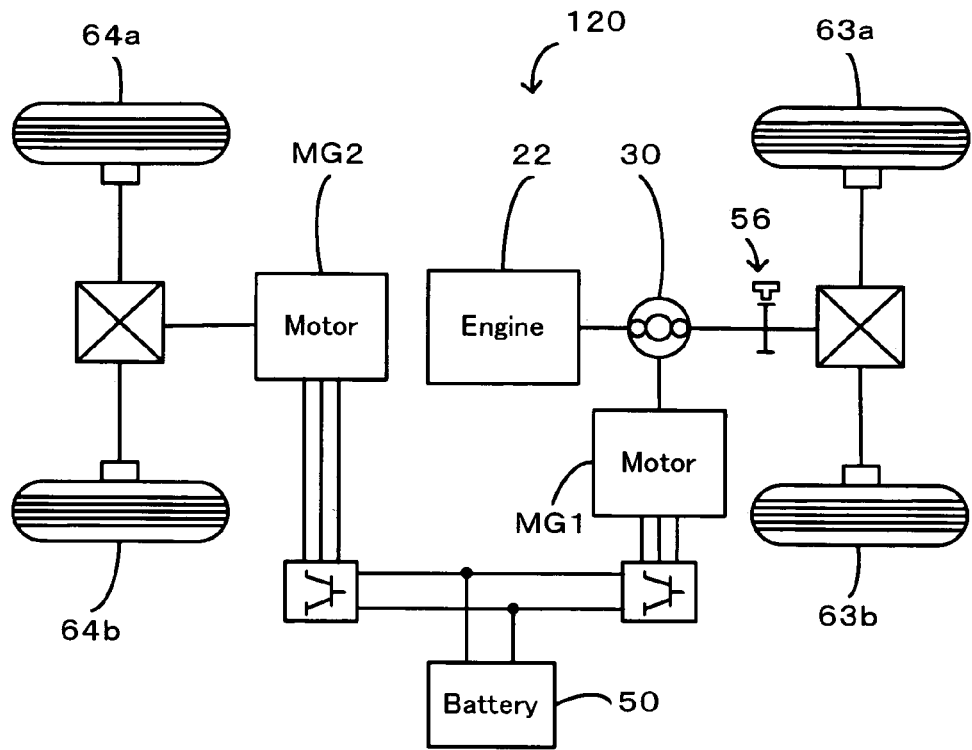
FIG. 4 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 4, the power of the motor MG2 may be output to another axle (that is, an axle linked with wheels 64a and 64b), which is different from an axle connected with the ring gear shaft 32a (that is, an axle linked with the wheels 63a and 63b).

Figure 5:
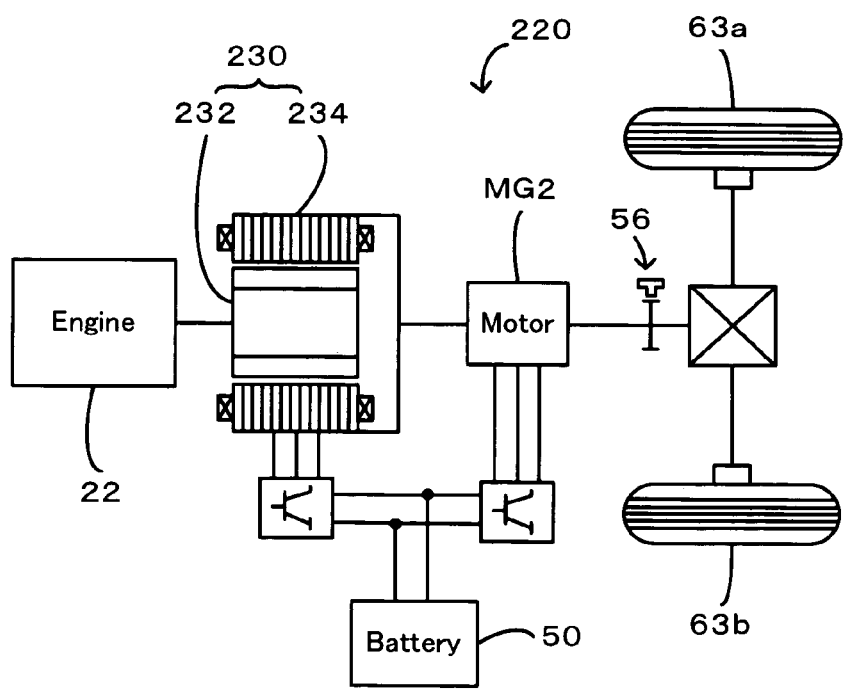
FIG. 5 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 5, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment and its modified examples discussed above are to be considered in all aspects as illustrative and not restrictive. There may be many other modifications, changes, and alterations without departing from the scope or spirit of the main characteristics of the present invention.

The disclose of Japanese Patent Application No. 2005-243951 filed Aug. 25, 2005 including specification, drawings and claims is incorporated herein by reference in its entirety.

What is claimed is:

1. A hybrid vehicle, comprising:
   an internal combustion engine that can output power to a drive shaft coupled to an axle via a gear mechanism;
   a motoring unit that is connected to an output shaft of said internal combustion engine and said drive shaft, and motors said internal combustion engine with input and output of power to and from said drive shaft;
   a motor that can input and output of power to and from said drive shaft;
   an estimation module that estimates that motoring resistance, which is resistance of said internal combustion engine in monitoring said internal combustion engine, becomes predetermined resistance or higher; and
   a starting control module that controls, when a start command of said internal combustion engine is given, said internal combustion engine, said motoring unit, and said motor so that said internal combustion engine is started while meshing gears in said gear mechanism is pressed toward one side by a first torque when it is estimated by said estimation module that said motoring resistance becomes lower than the predetermined resistance, and so that said internal combustion engine is started while the meshing gears in said gear mechanism is pressed toward one side by a second torque larger than said first torque when it is estimated by said estimation module that the motoring resistance becomes said predetermined resistance or higher.

2. A hybrid vehicle according to claim 1, further comprising:
   a securing unit that can secure said axle so as not to be rotated,
   wherein said starting control module performs the control so that said internal combustion engine is started while the meshing gears in said gear mechanism is pressed toward one side by said first torque or said second torque when the start command of said internal combustion engine is given with said axle being secured by said securing unit.

3. A hybrid vehicle according to claim 1, wherein said motoring unit is connected to the output shaft of said internal combustion engine and said drive shaft, and can output at least part of power from said internal combustion engine to said drive shaft with input and output of electric power and mechanical power.

4. A hybrid vehicle according to claim 1, further comprising:
   a temperature measurement unit that measures the temperature of said internal combustion engine,
   wherein said estimation module estimates that said motoring resistance becomes the predetermined resistance or higher when said measured temperature is lower than a predetermined temperature.

5. A hybrid vehicle according to claim 4, further comprising a start number measurement unit that measures the number of starts as the number of starts of said internal combustion engine after an ignition is turned on,
   wherein said estimation module estimates that the resistance of said internal combustion engine at the start of said internal combustion engine becomes the predetermined resistance or higher when said measured temperature is lower than a predetermined temperature and said measured number of starts is smaller than a predetermined number.

6. A hybrid vehicle according to claim 4, further comprising:
   a stop time measurement unit that measures a stop time of said internal combustion engine,
   wherein said estimation module estimates that said motoring resistance becomes the predetermined resistance or higher when said measured temperature is lower than a predetermined temperature and said measured stop time is a predetermined time or longer.

7. A hybrid vehicle according to claim 6, wherein said stop time measurement unit measures time since the last turning off of ignition as the stop time of said internal combustion engine.

8. A hybrid vehicle according to claim 6, wherein said stop time measurement unit measures time since the last stop of said internal combustion engine as the stop time of said internal combustion engine.

9. A control method of a hybrid vehicle, said hybrid vehicle comprising: an internal combustion engine that can output power to a drive shaft coupled to an axle via a gear mechanism; a motoring unit that is connected to an output shaft of said internal combustion engine and said drive shaft, and motors said internal combustion engine with input and output of power to and from said drive shaft; and a motor that can input and output of power to and from said drive shaft,
   said control method comprising the step of controlling, when a start command of said internal combustion engine is given, said internal combustion engine, said motoring unit, and said motor so that said internal combustion engine is started while meshing gears in said gear mechanism is pressed toward one side by a first torque when it is estimated that said motoring resistance as a resistance of said internal combustion engine in motoring said internal combustion engine becomes lower than a predetermined resistance, and so that said internal combustion engine is started while the meshing gears in said gear mechanism is pressed toward one side by a second torque larger than said first torque when it is estimated that the motoring resistance becomes said predetermined resistance or higher.

10. A control method of a hybrid vehicle according to claim 9, further comprising the step of performing the control while estimating that said motoring resistance becomes said predetermined resistance or higher when the temperature of said internal combustion engine is lower than a predetermined temperature.

11. A control method of a hybrid vehicle according to claim 10, further comprising the step of performing the control while estimating that the resistance of said internal combustion engine at the start of said internal combustion engine becomes the predetermined resistance or higher when the temperature of said internal combustion engine is lower than the predetermined temperature and the number of starts as the number of starts of said internal combustion engine after the ignition is turned on is smaller than a predetermined number.

12. A control method of a hybrid vehicle according to claim 10, further comprising the step of performing the control while estimating that said motoring resistance becomes said predetermined resistance or higher when the temperature of said internal combustion engine is lower than the predetermined temperature, and a stop time of said internal combustion engine is a predetermined time or longer.

13. A control method of a hybrid vehicle according to claim 12, wherein the stop time of said internal combustion engine is a time since the last stop of said internal combustion engine.

14. A control method of a hybrid vehicle according to claim 12, wherein the stop time of said internal combustion engine is a time since the last turning off of ignition.

* * * * *